(12) United States Patent
Robinette

(10) Patent No.: US 12,036,501 B2
(45) Date of Patent: Jul. 16, 2024

(54) FILTERING DEVICE FOR USE WITH A CEILING FAN

(71) Applicant: The Ceiling Sweeper, LLC, Wilmington, NC (US)

(72) Inventor: Scott Robinette, Wilmington, NC (US)

( * ) Notice: Subject to any disclaimer, the term of this patent is extended or adjusted under 35 U.S.C. 154(b) by 317 days.

(21) Appl. No.: 17/080,982

(22) Filed: Oct. 27, 2020

(65) Prior Publication Data

US 2021/0170319 A1 Jun. 10, 2021

Related U.S. Application Data

(60) Provisional application No. 62/943,944, filed on Dec. 5, 2019.

(51) Int. Cl.
*B01D 46/00* (2022.01)
*F04D 29/70* (2006.01)

(52) U.S. Cl.
CPC ..... *B01D 46/0056* (2013.01); *B01D 46/0028* (2013.01); *B01D 46/0032* (2013.01); *B01D 46/0036* (2013.01); *B01D 46/0038* (2013.01); *F04D 29/703* (2013.01)

(58) Field of Classification Search
None
See application file for complete search history.

(56) References Cited

U.S. PATENT DOCUMENTS

| | | | | |
|---|---|---|---|---|
| 602,547 A | * | 4/1898 | Titus | E21B 43/04 166/227 |
| 2,110,621 A | * | 3/1938 | Cohen | F04D 29/38 392/362 |
| 3,444,799 A | * | 5/1969 | Covington | F24F 7/065 454/329 |
| 4,422,824 A | * | 12/1983 | Eisenhardt, Jr. | F04D 25/088 55/467 |
| 4,640,668 A | * | 2/1987 | Yang | H02K 11/23 310/68 E |
| 4,697,606 A | * | 10/1987 | Ma | A45B 25/14 135/909 |
| 4,753,573 A | * | 6/1988 | McKnight | F24F 8/10 55/467 |
| 4,840,650 A | * | 6/1989 | Matherne | F24F 8/10 55/504 |

(Continued)

*Primary Examiner* — Brit E. Anbacht
(74) *Attorney, Agent, or Firm* — Ashley D. Johnson; Dogwood Patent and Trademark Law

(57) ABSTRACT

The presently disclosed subject matter is generally directed to a device that is releasably or permanently mountable on at least one blade of a conventional ceiling fan to reduce the number of particulates in the air. Specifically, the device cooperates with a filter to remove a wide variety of impurities from the air, such as dust, pollen, smoke, pet dander, and the like. The disclosed system comprises a device and a filter. The device includes a support that provides a base for the attachment of the filter. The device further includes an adaptor that cooperates with a series of joints to allow the size and shape of the support to be customized for a particular ceiling fan blade. Advantageously, the device can be coupled to a wide variety of ceiling fan blades to enable an associated filter to clean the air as the fan blades rotate, thereby reducing the number of particulates in the air.

20 Claims, 15 Drawing Sheets

(56) References Cited

U.S. PATENT DOCUMENTS

| | | | | |
|---|---|---|---|---|
| 4,889,543 A * | 12/1989 | Burt | ............... | F24F 8/108 95/286 |
| 5,022,819 A * | 6/1991 | Murcin | ............... | A61L 9/122 416/62 |
| 5,110,261 A * | 5/1992 | Junkin | ............... | F04D 29/388 416/62 |
| 5,370,721 A * | 12/1994 | Carnahan | ............... | F04D 29/701 55/467 |
| 5,383,765 A * | 1/1995 | Baxter | ............... | A61L 9/122 261/84 |
| 5,562,412 A * | 10/1996 | Antonelli | ............... | F04D 29/703 416/62 |
| 5,564,900 A * | 10/1996 | McAuley | ............... | F04D 29/005 239/289 |
| 7,052,524 B1 * | 5/2006 | Venezzio, Jr. | ............... | B01D 46/521 422/123 |
| 7,322,208 B1 * | 1/2008 | Griffin | ............... | F24F 7/065 135/16 |
| 7,537,015 B1 * | 5/2009 | Molnar, IV | ............... | A47B 37/04 108/50.13 |
| 9,599,116 B1 * | 3/2017 | Winger | ............... | F04D 29/325 |
| 10,455,911 B1 * | 10/2019 | Sendi | ............... | A45B 17/00 |
| 2002/0121296 A1 * | 9/2002 | Copple | ............... | A45B 3/00 135/16 |
| 2004/0074212 A1 * | 4/2004 | Yachi | ............... | B01D 46/0016 55/385.2 |
| 2004/0086386 A1 * | 5/2004 | Steinheiser | ............... | F04D 29/703 416/62 |
| 2005/0204713 A1 * | 9/2005 | Wu | ............... | B01D 46/10 55/496 |
| 2006/0140769 A1 * | 6/2006 | Frampton | ............... | F04D 25/088 416/210 R |
| 2006/0213157 A1 * | 9/2006 | Kalous | ............... | F24F 8/10 55/385.2 |
| 2006/0230934 A1 * | 10/2006 | Kalous | ............... | F24F 8/108 95/273 |
| 2008/0047241 A1 * | 2/2008 | Lillquist | ............... | B01D 46/0012 55/467 |
| 2008/0105287 A1 * | 5/2008 | Huali | ............... | A45B 3/04 135/16 |
| 2014/0113153 A1 * | 4/2014 | Afonso | ............... | B32B 27/08 428/518 |
| 2015/0267927 A1 * | 9/2015 | Zhang | ............... | B01D 46/10 55/497 |
| 2017/0173512 A1 * | 6/2017 | Van Den Bossche | ............... | B01D 46/0005 |
| 2019/0003492 A1 * | 1/2019 | Beznoska | ............... | B01D 46/0005 |
| 2019/0231040 A1 * | 8/2019 | Li | ............... | A45B 23/00 |
| 2019/0271129 A1 * | 9/2019 | Stephens | ............... | E02D 3/00 |
| 2020/0109714 A1 * | 4/2020 | Whittington | ............... | F24F 5/0096 |
| 2020/0316513 A1 * | 10/2020 | Zhao | ............... | B01D 46/88 |
| 2021/0106938 A1 * | 4/2021 | Zimmerman, III | ............... | B01D 46/0016 |
| 2021/0156576 A1 * | 5/2021 | Sim | ............... | F24F 13/20 |
| 2022/0016446 A1 * | 1/2022 | Whale | ............... | A61M 16/125 |
| 2022/0023577 A1 * | 1/2022 | Moore | ............... | A41F 1/002 |

* cited by examiner

FILTERING DEVICE FOR USE WITH A CEILING FAN

TECHNICAL FIELD

The presently disclosed subject matter relates generally to an air filter device for use with a ceiling fan.

BACKGROUND

Many homes and offices utilize one or more ceiling fans to provide a desired level of cooling and/or air circulation. Specifically, a ceiling fan functions to circulate air in a room to avoid warm air rising to the ceiling and to prevent cooler air from remaining at a lower level of the room. The ceiling fan also improves air flow to more effectively cool or warm people present within the room. Therefore, the ceiling fan comes into contact with a large volume of air while in use. However, the air in homes or businesses typically includes a mixture of plant pollens, mold spores, dust particles, soot, smoke, industrial residue, and other undesirable particulates. For example, pollen and mold spores are common allergens that can cause sinusitis, hay fever, or other respiratory ailments. Similarly, dust suspended in the air may be harmful to people that have emphysema or asthma. Additionally, airborne dust and smoke tend to discolor fabrics, such as curtains and furniture. As the particulates accumulate in a home or office, they are drawn into the ceiling fan and are circulated throughout the room. It would therefore be beneficial to provide an air filter device that effectively reduces or eliminates accumulated dust and particulates in the surrounding air.

SUMMARY

In some embodiments, the presently disclosed subject matter is directed to an air filtering device. Particularly, the device comprises a longitudinally extending support comprising a top surface and a foundation operably connected to the support. The foundation is defined by a pair of outer arms, each comprising a first end and a second end and a length therebetween, wherein the first ends of the outer arms are rotatably joined together. The term "rotatably joined" refers to the characteristic of being joined together at one end, but still being able to move an arm second end relative to the second end of the opposing arm. The foundation further includes a pair of interior arms, each comprising a first end and a second end, wherein the first ends of the outer arms are rotatably joined together, and wherein the second end of each interior arm is rotatably joined to the length of an outer arm. The foundation comprises an adaptor positioned between the second end of each outer arm, wherein the adaptor can increase or decrease the distance between the second ends of each outer arm.

In some embodiments, the device further comprises an air filter sized and shaped to be releasably attached to the top surface of the support.

In some embodiments, the air filter is attached to the support through the use of hook and loop closure, magnets, pressure-fit attachment, snap fit attachment, screws, bolts, clips, ties, fasteners, or combinations thereof.

In some embodiments, the adaptor includes a first segment and a second segment that cooperate via a telescoping arrangement.

In some embodiments, the device further comprises a gripping segment that facilitates movement of the first and second segments.

In some embodiments, the first ends of the outer arms are rotatably joined at an acute angle.

In some embodiments, the first segment comprises a series of teeth that releasably fit into grooves positioned on the second segment.

In some embodiments, the device further comprises a plurality of L-shaped braces.

In some embodiments, the presently disclosed subject matter is directed to a kit. Specifically, the kit comprises at least one air filter and at least one device. Each device comprises a longitudinally extending support comprising a top surface, and a foundation operably connected to the support. The foundation is defined by a pair of outer arms, each comprising a first end and a second end and a length therebetween, wherein the first ends of the outer arms are rotatably joined together. The foundation includes a pair of interior arms, each comprising a first end and a second end, wherein the first ends of the outer arms are rotatably joined together, and wherein the second end of each interior arm is rotatably joined to the length of an outer arm. The foundation includes an adaptor positioned between the second end of each outer arm, wherein the adaptor can increase or decrease the distance between the second ends of each outer arm. The at least one air filter releasably attaches to the at least one device.

In some embodiments, the air filter comprises fiberglass, paper, fiberglass, paper, foam, woven fabric, activated charcoal, carbon, zeolite, or combinations thereof.

In some embodiments, the air filter is electrostatic.

In some embodiments, the air filter comprises one or more antimicrobial materials.

In some embodiments, the adaptor includes a first segment and a second segment that cooperate via a telescoping arrangement.

In some embodiments, the first ends of the outer arms are rotatably joined at an acute angle.

In some embodiments, the first segment comprises a series of teeth that releasably fit into grooves positioned on the second segment.

In some embodiments, the presently disclosed subject matter is directed to a method of reducing the number of particulates in the air. Specifically, the method comprises attaching a device to at least one blade of a ceiling fan. The device comprises a longitudinally extending support comprising a top surface and a foundation operably connected to the support. The foundation is defined by a pair of outer arms, each comprising a first end and a second end and a length therebetween, wherein the first ends of the outer arms are rotatably joined together. The foundation includes a pair of interior arms, each comprising a first end and a second end, wherein the first ends of the outer arms are rotatably joined together, and wherein the second end of each interior arm is rotatably joined to the length of an outer arm. The foundation comprises an adaptor positioned between the second end of each outer arm, wherein the adaptor can increase or decrease the distance between the second ends of each outer arm. The method comprises releasably attaching an air filter to the support of the device and initiating movement of the ceiling fan blades such that air passes through the air filter. The number of particulates in the air is thereby reduced.

In some embodiments, the device is positioned on a top surface of a ceiling fan blade.

BRIEF DESCRIPTION OF THE DRAWINGS

The previous summary and the following detailed descriptions are to be read in view of the drawings, which illustrate some (but not all) embodiments of the presently disclosed subject matter.

FIG. 2b is a bottom plan view of the filtration device of FIG. 2a.

FIG. 11b is a bottom plan view of the ceiling fan of FIG. 11a.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 1:
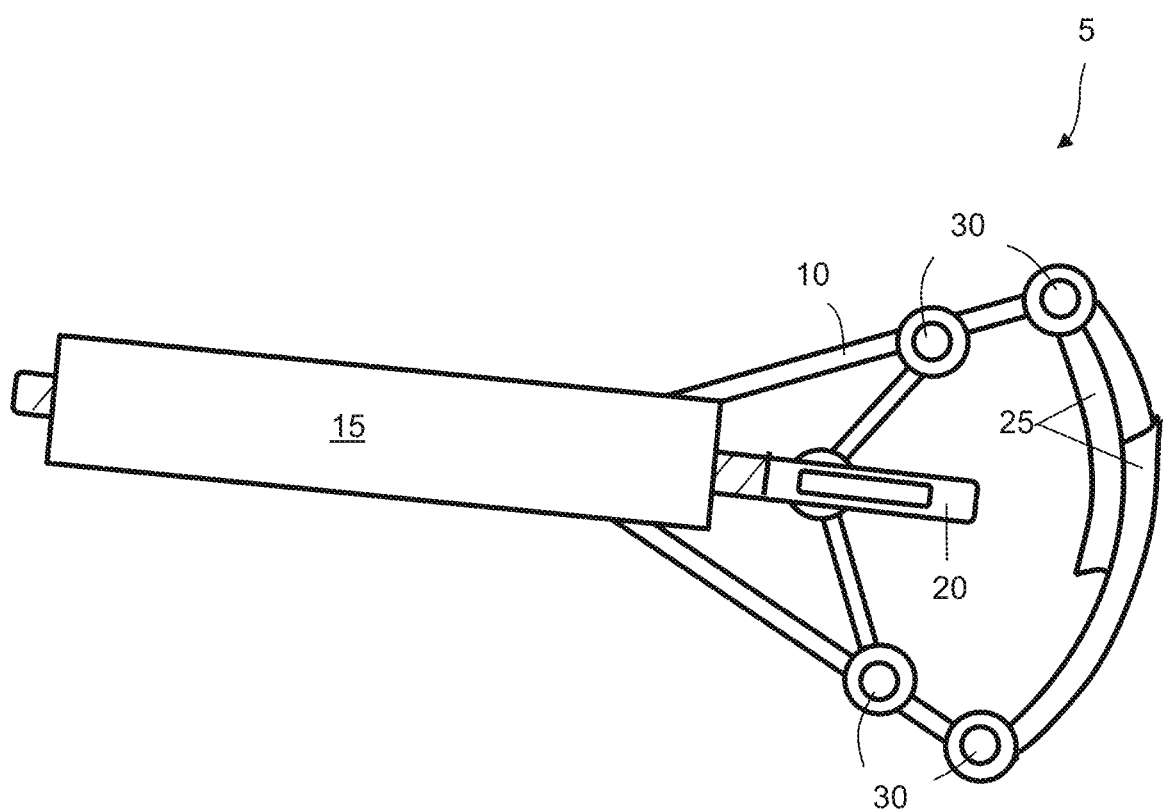
FIG. 1 is a top plan view of a filtration system in accordance with some embodiments of the presently disclosed subject matter.

The presently disclosed subject matter is generally directed to a device that is releasably or permanently mountable on at least one blade of a conventional ceiling fan to reduce the number of particulates in the air. Specifically, the device cooperates with a filter to remove a wide variety of impurities from the air, such as dust, pollen, smoke, pet dander, and the like. FIG. 1 illustrates one embodiment of system 5 comprising device 10 and filter 15. As shown, the device includes support 20 that provides a base for the attachment of the filter. The device further includes adaptor 25 that cooperates with a series of joints 30 to allow the size and shape of the support to be customized for a particular ceiling fan blade, as described in more detail below. Advantageously, the device can be coupled to a wide variety of ceiling fan blades to enable an associated filter to clean the air as the fan blades rotate, thereby reducing the number of particulates in the air.

Figure 2A:
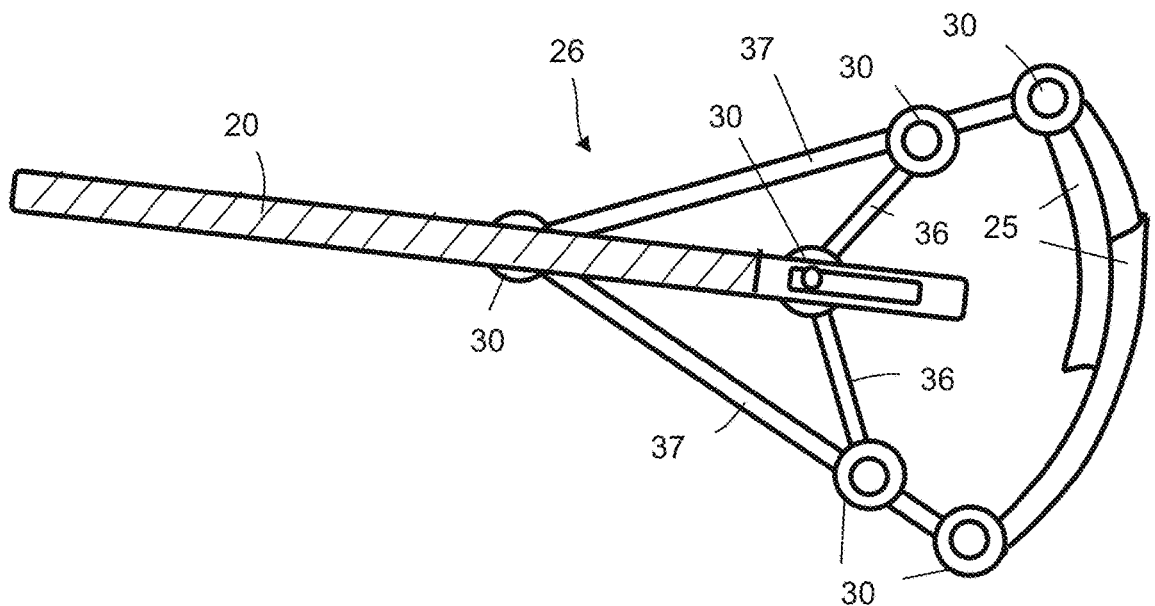
FIG. 2a is a top plan view of a filtration device in accordance with some embodiments of the presently disclosed subject matter.
Figure 2B:
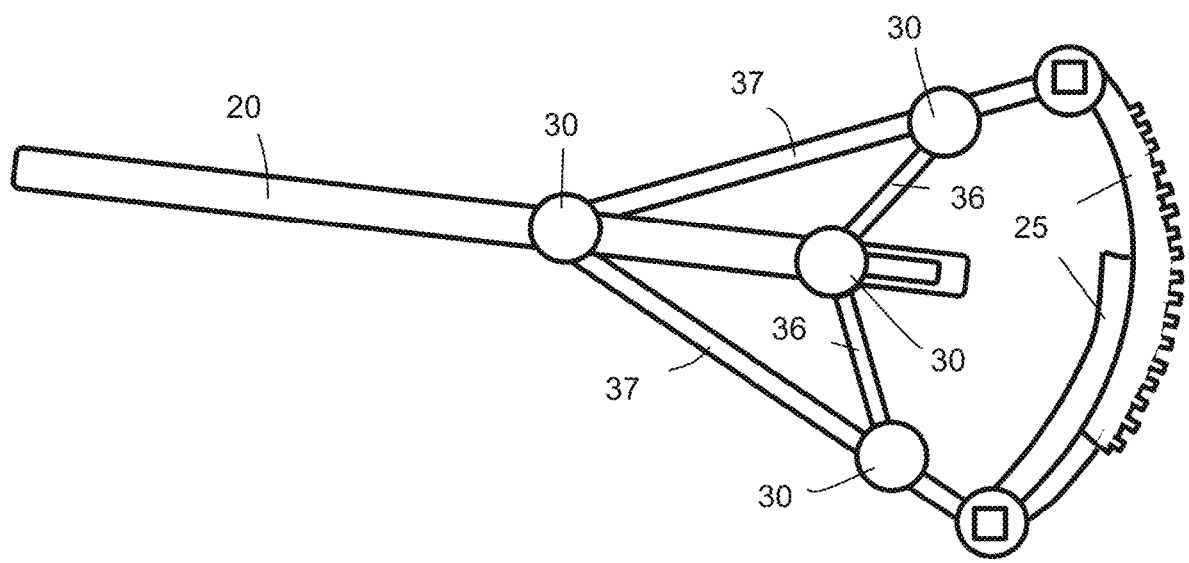

FIGS. 2a and 2b illustrate one embodiment of device 10 configured to mount on a standard ceiling fan blade. As shown, the device includes support 20 that allows for the attachment of filter 15. The device further comprises foundation 26 that includes adaptor 25, inner arms 36, and outer arms 37 that move relative to each other via joints 30 to allow for proper sizing on a ceiling fan blade, as set forth in more detail herein below.

Figure 3A:
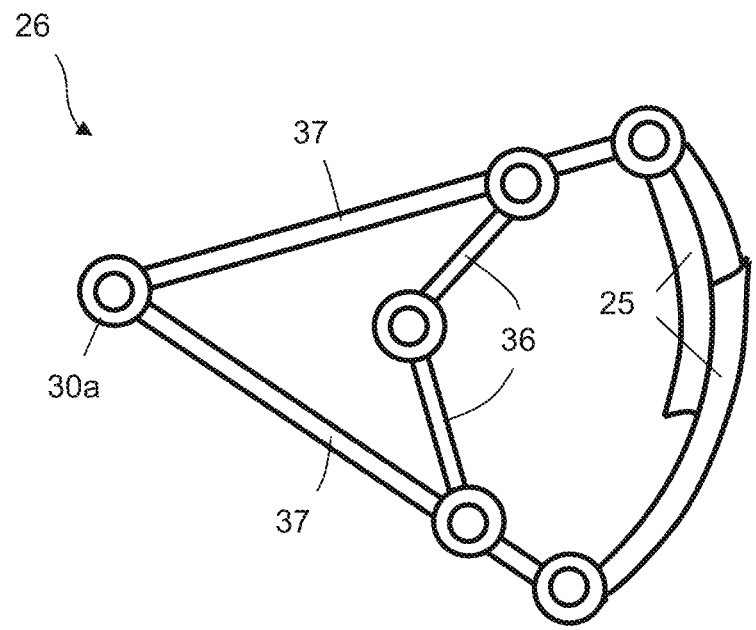
FIG. 3a is a top plan view of a device foundation in accordance with some embodiments of the presently disclosed subject matter.
Figure 3B:
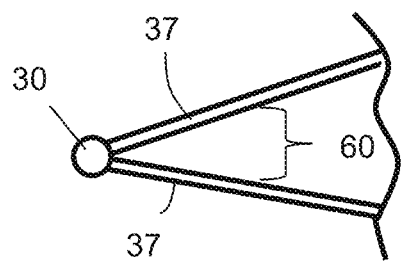
FIGS. 3b-3d are fragmentary top plan views illustrating various joint angles in accordance with some embodiments of the presently disclosed subject matter.
Figure 3C:
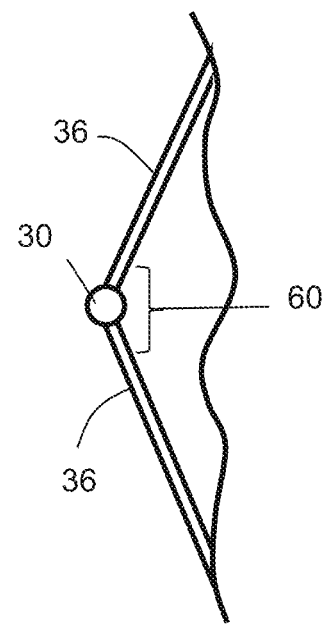
Figure 3D:
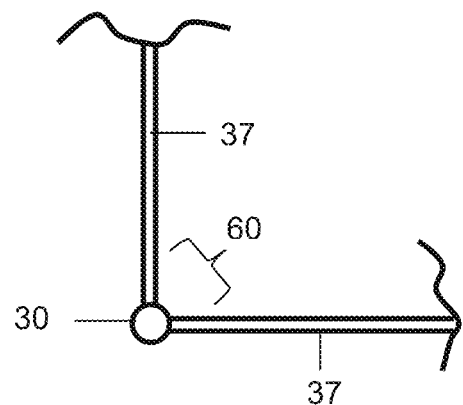

FIG. 3a illustrates one embodiment of foundation 26. As shown, the foundation can include a plurality of outer arms 37, a plurality of inner arms 36, and adaptor 25. The term "plurality" refers to two or more. The inner arms, outer arms, and adaptor are connected through a series of joints. The term "joint" refers to a structure that joins or connects two or more elements and holds them in place, typically by a fastener (such as a screw, bolt, or rivet). The joint can be a rotational joint, configured to rotatably couple a first element to a second element. For example, one arm can rotate relative to a second arm. In other embodiments, both elements can rotate relative to each other. The connecting joint allows for angle 60 between a pair of elements to be increased or decreased as desired by the user. In some embodiments, the angle can be acute (e.g., less than about 90 degrees), as shown in FIG. 3b. In other embodiments, angle 60 can be obtuse (e.g., greater than 90 degrees), as shown in FIG. 3c. In some embodiments, angle 60 can be about 90 degrees, as shown in FIG. 3d. Thus, the angle between two inner arms, two outer arms, an outer arm and an adaptor, and/or an inner arm and an outer arm can be acute, obtuse, or configured at an approximate right angle.

Figure 4A:
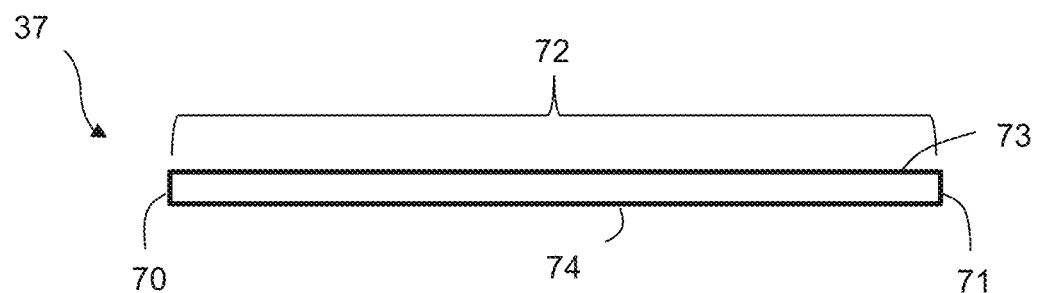
FIG. 4a is a top plan view of a device outer arm in accordance with some embodiments of the presently disclosed subject matter.

Each outer arm 37 comprises first and second ends 70, 71 with length 72 therebetween, as shown in FIG. 4a. Each outer arm can be configured in any desired size to allow for use with a wide variety of ceiling fan blades. For example, outer arm 37 can have length 72 of about 3-20 inches (e.g., at least about/no more than about 3, 4, 5, 6, 7, 8, 9, 10, 11, 12, 13, 14, 15, 16, 17, 18, 19, or 20 inches). The outer arm can have any thickness, such as about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). However, it should be appreciated that the dimensions of each outer arm are not limited.

As shown in FIG. 4a, each outer arm also includes top face 73 and opposing bottom face 74. The top face is positioned towards the external environment (i.e., the room ceiling), while the bottom face is positioned adjacent to a ceiling fan blade when the device is assembled.

Figure 4B:
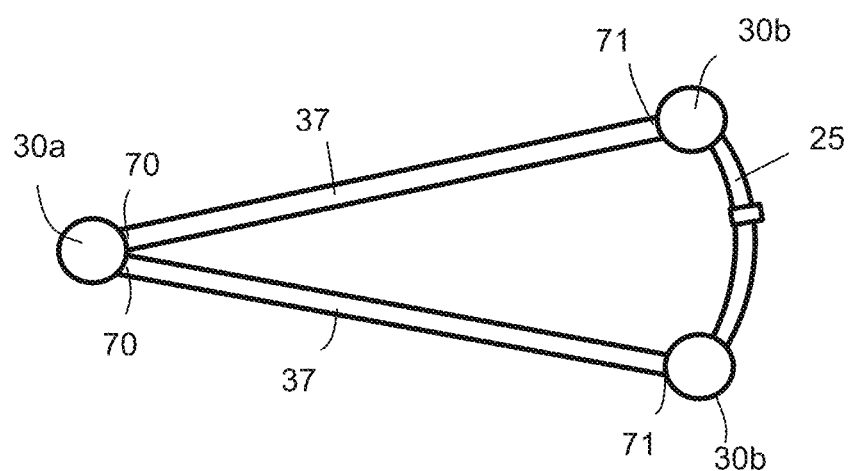
FIG. 4b is a top plan view of a pair of device outer arms attached to device adaptors in accordance with some embodiments of the presently disclosed subject matter.

First end 70 of each outer arm is attached to the first end of an adjacent outer arm at connecting joint 30a, as illustrated in FIG. 4b. The arms can be attached to the joint through any known mechanism, such as (but not limited to) the use of adhesive, welding, thermoforming, screws, bolts, magnets, and the like. In some embodiments, the angle between the first and second outer arms at connecting joint 30a is acute (e.g., less than about 90, 80, 70, 60, 50, 40, 30, 20, or 10 degrees).

Second end 71 of each outer arm is attached to one end of adaptor 25 at adaptor joint 30b. The term "adaptor" refers to any element that allows the distance between opposing adaptor joints (and thus the width of the device) to be increased or decreased. For example, in some embodiments, the adaptor can include segments that can be added or removed to lengthen or shorten the distance between the adaptor joints. Alternatively, the adaptor can include a telescoping arrangement allowing adjacent segments to be increased or decreased in length.

Figure 5A:
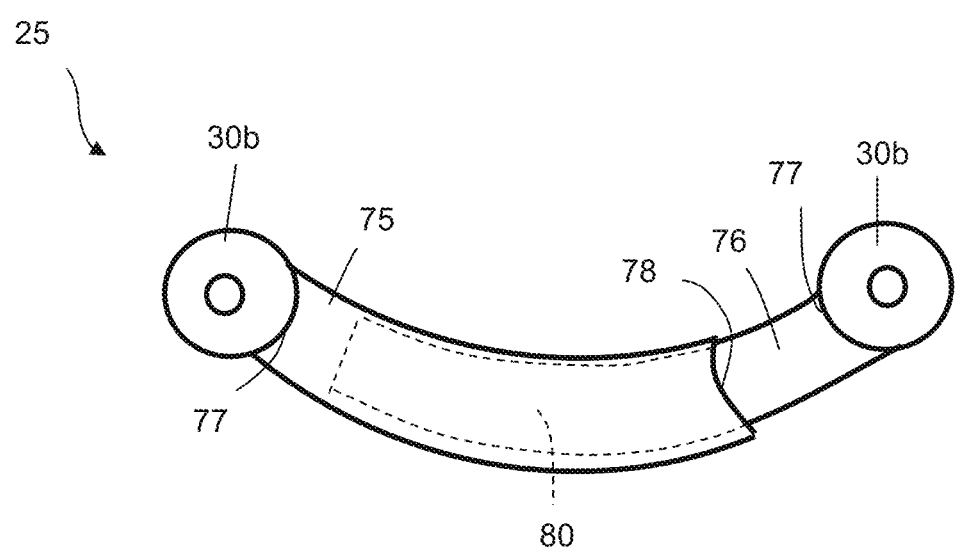
FIG. 5a is a top plan view of a device adaptor in accordance with some embodiments of the presently disclosed subject matter.

FIG. 5a illustrates one embodiment of adaptor 25 comprising first segment 75 and second segment 76. Each segment includes first end 77 attached to adaptor joint 30b using any known method, such as (but not limited to) the use of welding, adhesive, thermoforming, and the like. The first segment includes interior compartment 80 and open second end 78 that allows at least a portion of the second segment to be housed within the compartment. In this way, the first and second segments can cooperate via a telescoping arrangement. Thus, the outer circumference of first segment 75 can be slightly greater than the outer circumference of the second segment. In this way, the second segment can be slidably received within interior compartment 80 of the first segment to adjust the overall width of the device (e.g., to couple the device to a corresponding ceiling fan blade). Particularly, when the user desires to narrow the distance between the two adaptor joints, the second segment can be advanced towards the first segment, such that a portion of the second segment is housed within interior compartment 80. When the user desires to widen the distance between the two adaptor joints to fit on a relatively wide ceiling fan blade, at least a portion of the second segment is removed from interior compartment 80. Although depicted as curved in FIG. 5a, the adaptor can have any desired configuration (e.g., straight, angled).

Figure 5B:
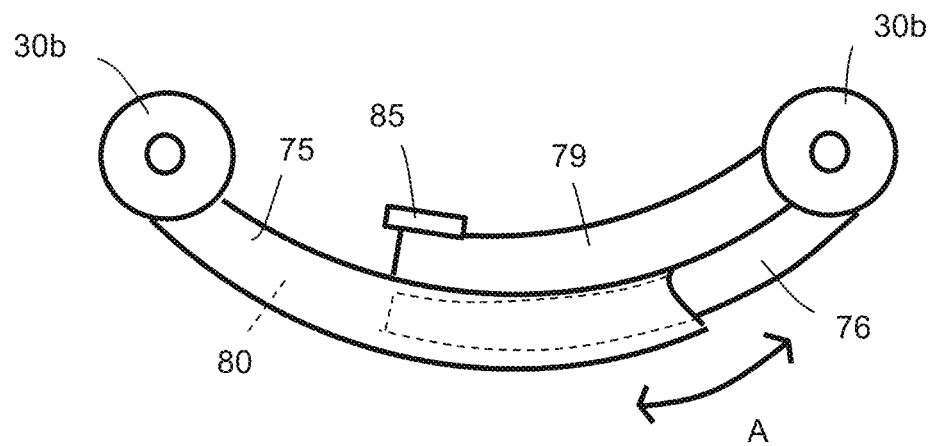
FIG. 5b is a top plan view of a device adaptor in accordance with some embodiments of the presently disclosed subject matter.

In some embodiments, adaptor can include gripping segment 79 that allows a user to easily maneuver the adaptor as desired, as shown in FIG. 5b. The gripping segment can be attached to a portion of second segment 76 such that they move together. Alternatively, gripping segment 79 can be attached to adaptor joint 30b such that when the gripping segment is moved toward or away from the opposing adaptor joint, the second segment (also attached to the adaptor joint) moves into and out of interior compartment 80. The gripping segment can optionally include ledge 85 that allows a user to easily grasp the gripping segment and maneuver the second segment into and out of the interior compartment to widen and narrow the distance between adaptor joints 30b, as illustrated by Arrow A. Ledge 85 can have any desired configuration.

Figure 5C:
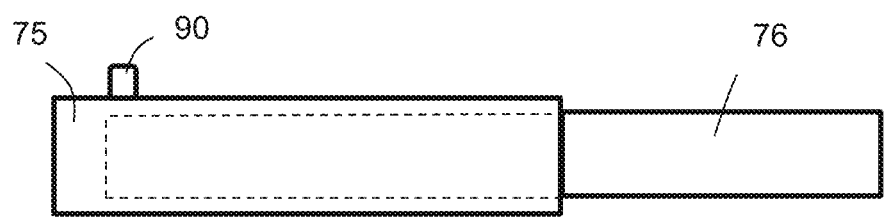
FIG. 5c is a side plan view of a device actuator in accordance with some embodiments of the presently disclosed subject matter.

In some embodiments, adaptor 25 can include an actuator that allows the first and second segments to move relative to each other. As shown in FIG. 5c, actuator 90 can be configured as a button that when depressed, allows second segment 76 to move within the interior compartment of first segment 75 to increase or decrease the adaptor length. Once the button is no longer depressed, the first and second segments are stationary in position (i.e., the second segment cannot move relative to the first segment). In some embodiments, the actuator can be spring loaded such that when the actuator is pressed or activated, the device is at its widest point. First and second segments 75, 76 can then be squeezed together to reduce the adaptor length through the telescoping arrangement of the arms. The term "spring-loaded" refers to a device having at least one element that can be biased or urged into at least one position by a spring.

Figure 5D:
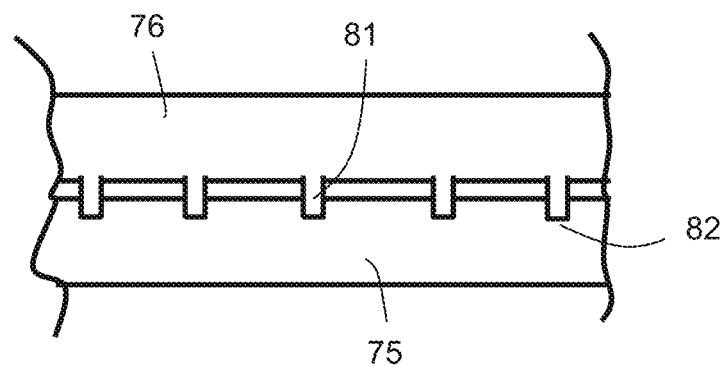
FIG. 5d is a side plan view of adaptor teeth and grooves in accordance with some embodiments of the presently disclosed subject matter.

In other embodiments, the second segment can include a series of teeth 81 that fit into corresponding grooves 82 along the length of the first segment, as shown in FIG. 5d. The teeth can be moved to adjacent grooves through the application of pressure by the user. When no pressure is applied, each tooth is stationary within a corresponding groove and does not move. In this way the first and second segments are maintained in position until a user desires to alter the adaptor.

It should be appreciated that the presently disclosed subject matter is not limited and any known actuator can be used, such as (but not limited to) buttons, switches, sliders, knobs, teeth, grooves, and the like.

The dimensions of the adaptor can be adjustably configured to be about the same size as a corresponding ceiling fan blade with regard to thickness and span from one fan blade edge to the other. Therefore, the adaptor length can be adjusted to fit any desired fan blade width.

Figure 6A:
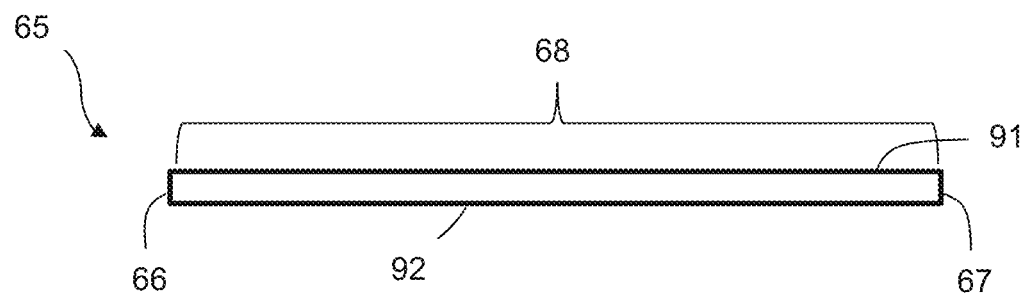
FIG. 6a is a top plan view of a device inner arm in accordance with some embodiments of the presently disclosed subject matter.

As set forth above, the device foundation also includes at least two interior arms 65 that function to reinforce support 20. Each interior arm comprises first and second ends 66, 67 and length 68 therebetween, as shown in FIG. 6a. The interior arms can be configured in any desired size to allow for use with a wide variety of ceiling fan blades. For example, interior arms 65 can have length 68 of about 1-15 inches (e.g., at least about/no more than about 1, 2, 3, 4, 5, 6, 7, 8, 9, 10, 11, 12, 13, 14, or 15 inches). However, it should be appreciated that the dimensions of the arms are not limited and can be configured with a length outside the given range.

As shown in FIG. 6a, each interior arm also includes top face 91 and opposing bottom face 92. The top face is positioned towards the external environment (i.e., the room ceiling), while the bottom face is positioned adjacent to a ceiling fan blade when the device is assembled.

Figure 6B:
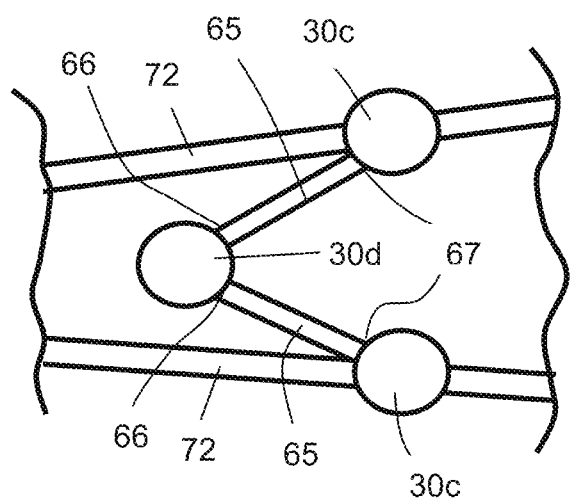
FIG. 6b is a top plan view of a pair of device inner arms attached to outer arms in accordance with some embodiments of the presently disclosed subject matter.

First end 66 of each interior arm is attached to the first end of an adjacent interior arm at inner joint 30d, as shown in FIG. 6b. Second end 67 of each interior arm is joined along length 72 of a corresponding outer arm at middle joint 30c. Each interior arm can be connected at joints 30c and 30d using any known method (e.g., the use of adhesives, magnets, welding, screws, clips, bolts, and the like).

Figure 6C:
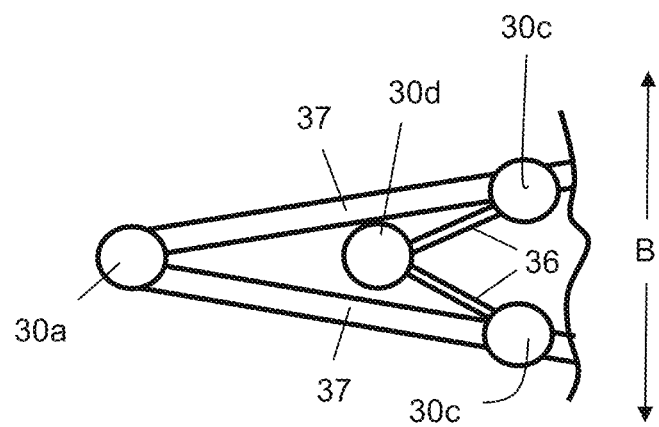
FIGS. 6c and 6d illustrate one embodiment of a pair of device inner arms in use in accordance with some embodiments of the presently disclosed subject matter.
Figure 6D:
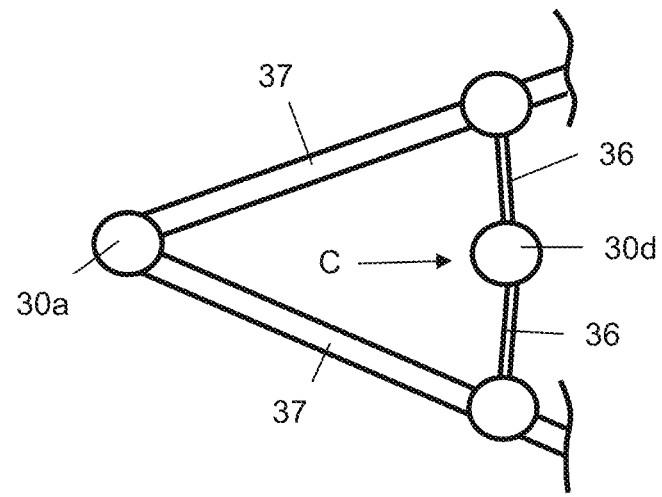

The inner arms reinforce support 20 and further enable the support to be properly positioned when the adaptor is adjusted. For example, FIGS. 6c and 6d illustrate one embodiment wherein joints 30d and 30c allow the support to be properly positioned in the center of the device as the adaptor is adjusted. As the adaptors move outer arms 37 away from each other (as illustrated by Arrows B), inner arms 36 are adjusted to make up for the increased distance between the outer arms. Thus, inner joint 30d and the inner arms are moved towards adaptor 25 to compensate for the additional length between the outer arms, as shown by Arrow C in FIG. 6d.

Figure 7A:
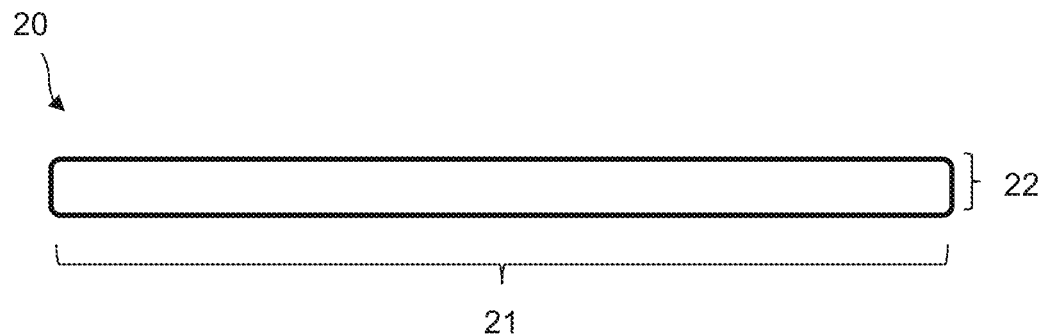
FIG. 7a is a top plan view of a device support in accordance with some embodiments of the presently disclosed subject matter.
Figure 7B:
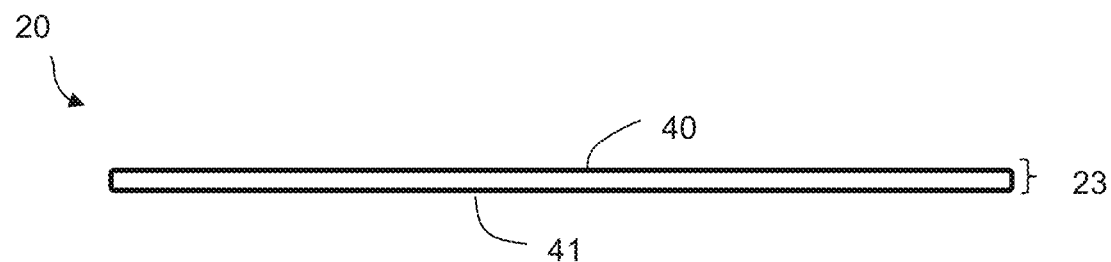
FIG. 7b is a side plan view of a device support in accordance with some embodiments of the presently disclosed subject matter.

FIGS. 7a and 7b illustrate one embodiment of support 20 that provides for the attachment of filter 15. As shown in FIG. 7a, the support includes length 21, width 22, and thickness 23. The term "length" refers to the maximum dimension of the support in the longitudinal direction. The term "width" refers to the maximum dimension of the support perpendicular to the length. The term "thickness" refers to the longest dimension of the support perpendicular to both the length and width.

The support is configured to extend away from the adaptors up the center of the fan blade. In some embodiments, the device is configured such that support 20 is approximately centered about the midline of the fan blade.

The support can be configured in any desired size to allow for use with a wide variety of ceiling fan blades. For example, the support can have length 21 of about 5-20 inches (e.g., at least about/no more than about 5, 6, 7, 8, 9, 10, 11, 12, 13, 14, 15, 16, 17, 18, 19, or 20 inches). Similarly, the support can have a width 22 of about 1-10 inches (e.g., at least/no more than about 1, 2, 3, 4, 5, 6, 7, 8, 9, or 10 inches). The support can have any thickness 23, such as about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). However, it should be appreciated that the dimensions of support 20 are not limited and can be configured with a length, width, and/or thickness outside the given ranges.

As shown in FIG. 7b, the support also includes top face 40 and opposing bottom face 41. The top face is positioned towards the external environment (i.e., the room ceiling), while the bottom face is positioned to face a ceiling fan blade when the device is assembled.

The top face of the support can include mount 45 that allows for the connection of air filter. Mount 45 can include any mechanism that allows a filter to releasably attach to the top face of support 20. In this way, the filter can be removed on demand, such as for replacement or cleaning. Filter 15 can be joined to mount 45 using any desired mechanism, such as (but not limited to) a snap fit arrangement, mechanical attachments (e.g., screws, rivets, clasps, clips, hooks), VELCRO®, hinges, and the like. Thus, a filter can be attached to support 20 and replaced with a fresh filter after a desired amount of time. Alternatively, filter 15 can be removed, cleaned, and reconfigured on the disclosed device.

Figure 7C:
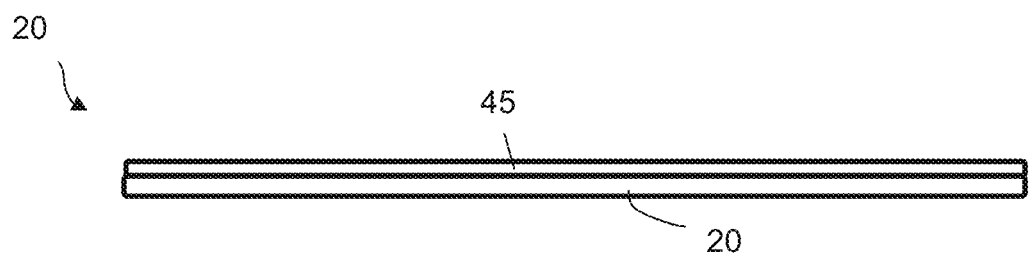
FIG. 7c is a side plan view of a device support comprising a mount in accordance with some embodiments of the presently disclosed subject matter.
Figure 7D:
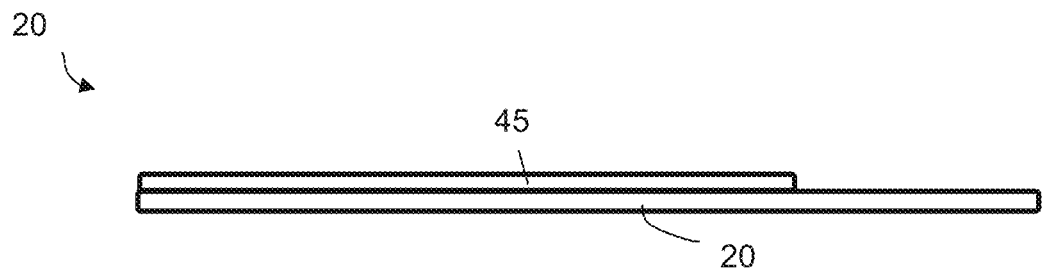
FIG. 7d is a side plan view of a device support comprising a mount in accordance with some embodiments of the presently disclosed subject matter.

In some embodiments, the mount can extend about the full length of support 20, as shown in FIG. 7c. Alternatively, the mount can be configured to span a portion of the length of the support, as shown in FIG. 7d.

Figure 8A:
FIG. 8a is a top plan view of a device support comprising an aperture in accordance with some embodiments of the presently disclosed subject matter.
Figure 8B:
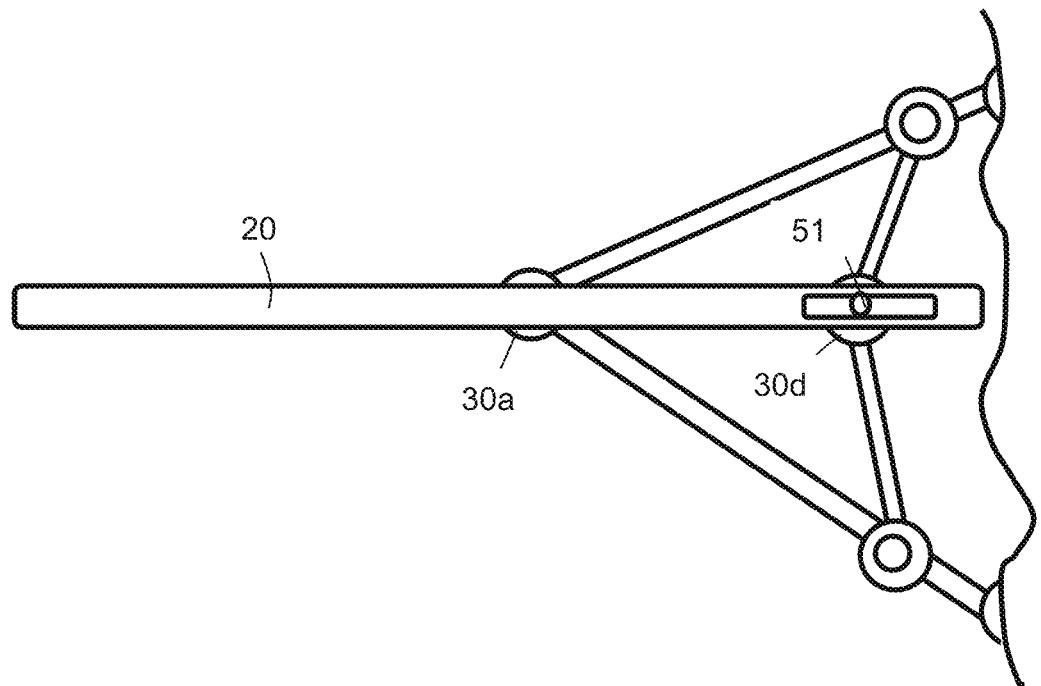
FIG. 8b is a top plan view of an assembled device support in accordance with some embodiments of the presently disclosed subject matter.
Figure 8C:
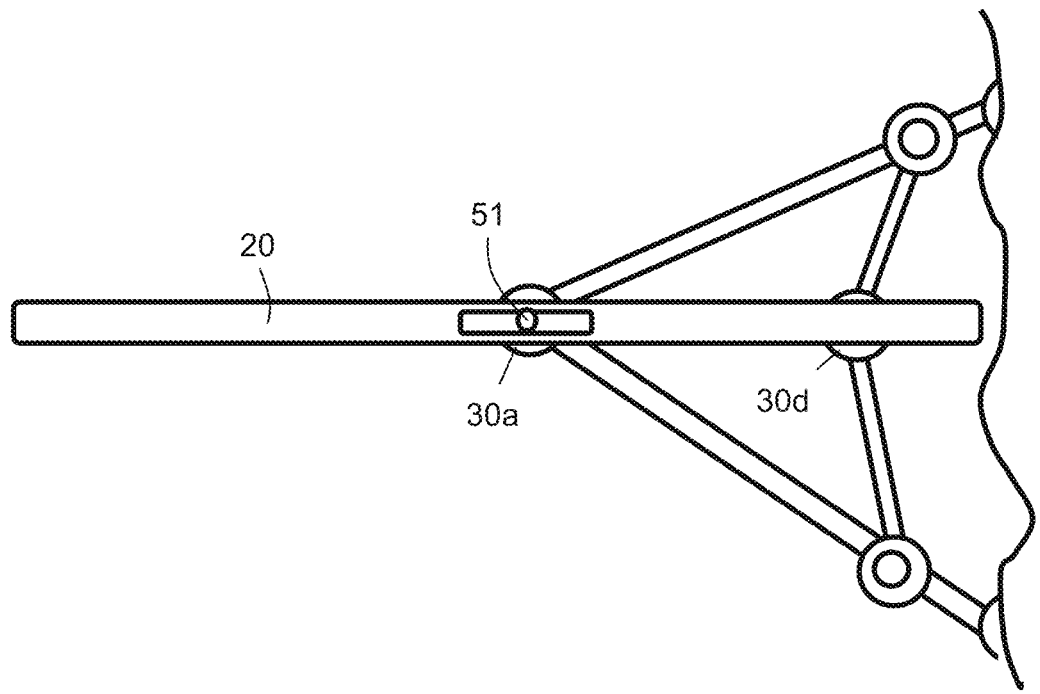
FIG. 8c is a top plan view of an assembled device support in accordance with some embodiments of the presently disclosed subject matter.

In some embodiments, support 20 can include aperture 50, as illustrated in FIG. 8a. The term "aperture" refers to an opening of any shape or size that passes through the support. The aperture can be used to adjust the position of the support relative to rest of the device. For example, as shown in FIGS. 8b and 8c, the aperture allows the length of the support to be adjusted as desired by the user (i.e., to fit a particular ceiling fan blade). As shown, set screw 51 (or any other suitable element) can pass through the aperture to connect the support to inner joint 30d at any location within the aperture. In this way, the position of the support can be adjusted as needed. In the embodiment of FIG. 8b, the support can be further attached to connector joint 30a using any desired method (e.g., the use of magnets, screws, adhesive, welding, clips, bolts, ties, VELCRO®, pins, screws, etc.). In this embodiment, the support can be further attached to inner joint 30d to provide stability for the support.

In some embodiments, filter 15 is disposed substantially perpendicular to support 20. In this way, the filter has full exposure to air circulating from the ceiling fan. However, the presently disclosed subject matter is not limited and the filter can be disposed at any angle relative to support 20.

Figure 9:
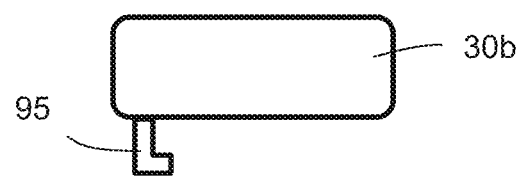
FIG. 9 is a side plan view of a device brace in accordance with some embodiments of the presently disclosed subject matter.

Optionally, the device further includes a pair of braces 95 configured on the bottom face of the device, as shown in FIG. 9. For example, the braces can be positioned on the bottom side of adaptor joint 30b (i.e., to directly contact a ceiling fan blade). The braces can be sized and shaped to wrap around opposing fan blade edges. Thus, in some embodiments, the braces can be configured in an "L" shape. However, the configuration of braces 95 are not limited so long as they enable releasable attachment to a ceiling fan blade.

The braces can include any material that grips or prevents sliding, such as (but not limited to) rubber, polyurethane, polymeric material, and/or any other material with a high coefficient of friction. In this way, device 5 is prevented from slipping down the ceiling fan blade when the blade is in motion.

In some embodiments, at least a portion of the bottom surface of the device (e.g., the surface in contact with the ceiling fan blade) can include a layer of material to protect the fan blade from damage and/or to ensure a snug fit of the device. The material can include any soft and/or padded element, such as (but not limited to) fabric, rayon, polyester blend, foam, cardboard, paper, felt, or combinations thereof. The material can further provide additional non-skid characteristics to support 20, preventing movement of the device during use of the ceiling fan.

Figure 10A:
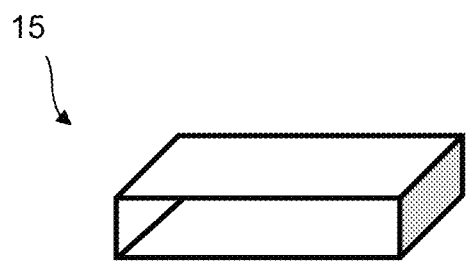
FIG. 10a is a perspective view of an air filter housing in accordance with some embodiments of the presently disclosed subject matter.

Filter 15 is not limited and any known filter capable of attaching to support 20 can be used. For example, in some embodiments, the filter can include a frame with an open grid to allow air to pass therethrough, as shown in FIG. 10*a*. Air filter 15 can be constructed from any one of a wide variety of porous filter materials capable of capturing dust and other particulates that are suspended in the air. Suitable materials can thus include (but are not limited to) fiberglass, paper, foam, woven fabric, activated charcoal, or combinations thereof. Alternatively or in addition, filter 15 can include one or more sorbent filter materials that absorb gases and odors, such as (but not limited to) carbon, zeolite, and the like.

Figure 10B:
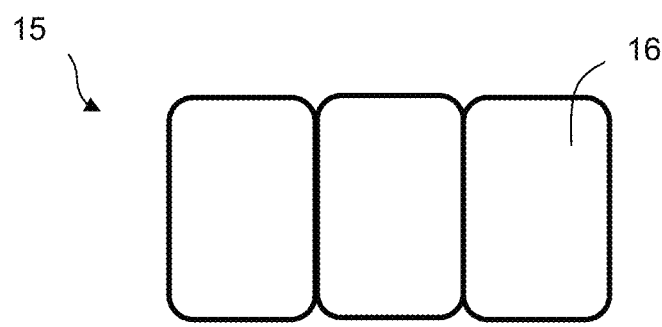
FIG. 10b is a top plan view of an air filter in accordance with some embodiments of the presently disclosed subject matter.

In some embodiments, filter 15 can be electrostatic with self-charging woven panels 16, as shown in FIG. 10*b*. The term "electrostatic" refers to the sudden flow of electricity between two electrically charged objects caused by contact, an electric short, or dielectric breakdown. Particularly, the flow of air through filter 15 creates an electrostatic charge resulting from friction as the air flows through the filter. Dust and other particulates are attracted to the filter surface and are held due to the electrostatic charge.

Optionally, filter 15 can include one or more antimicrobial materials to inhibit the growth of mold, fungi, bacteria, and other airborne contaminants. Any known antimicrobial material can be used.

The materials used to construct filter 15 are self-supporting, such that the filter does not collapse or lose integrity during use. For example, in some embodiments, the filter can include a cardboard or plastic support that houses the filter materials. When the filter is upstanding, it is positioned to filter the maximum amount of air. If the filter was to deform or collapse during fan rotation, it would adversely affect the ability to filter air.

In some embodiments, filter 15 is disposable and constructed for a one-time use. However, the presently disclosed subject matter also includes embodiments wherein the filter is capable of being cleaned to allow the user to reuse it a desired number of times.

Figure 10C:
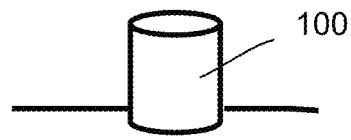
FIG. 10c is a side plan view of an indicator in accordance with some embodiments of the presently disclosed subject matter.

Optionally, device 5 can include indicator 100, such as a noise or light that lets the user know when the air filter has been properly attached and is in operating condition, as shown in FIG. 10*c*. In some embodiments, the indicator can designate when it is time to clean or change filter 15. The indicator can be positioned on any surface of device 5 or filter 15.

Device 5 can be constructed from any rigid material. The term "rigid material" refers to a material that is solid and does not readily bend. Suitable rigid materials can therefore include (but are not limited to) wood, resin, metal, plastic, or combinations thereof. In some embodiments, the materials used to construct device 5 are lightweight, having a weight of less than about 2 pounds. Advantageously, a lightweight device will provide minimal to no drag on the corresponding ceiling fan during use.

Device 5 can be constructed using any known method, such as (but not limited to) a coextrusion process, welding, and the like.

Figure 11A:
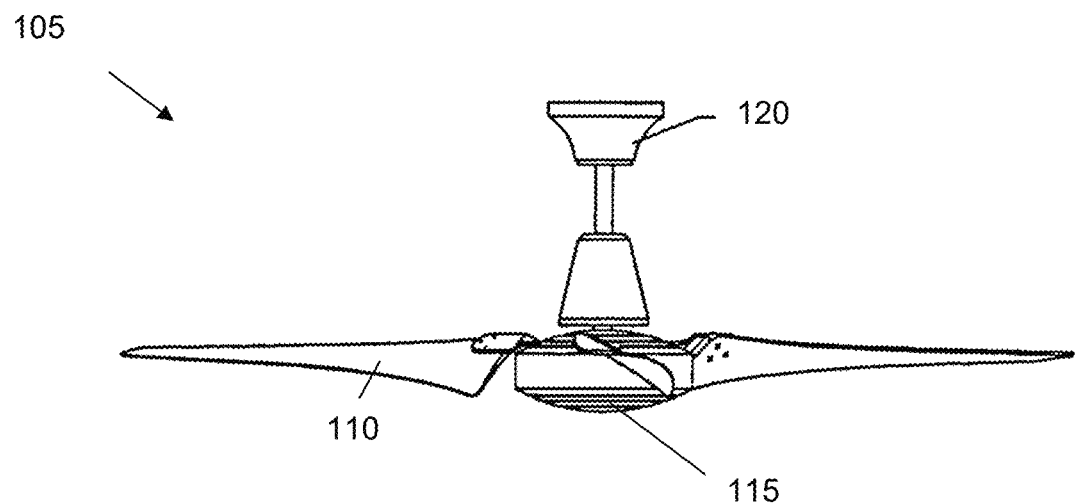
FIG. 11a is side plan view of a conventional ceiling fan.
Figure 11B:
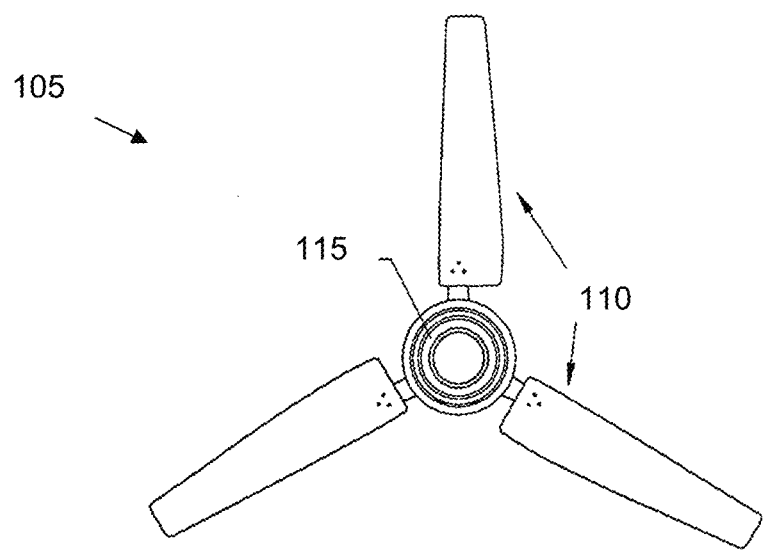

In use, the disclosed device can be easily retrofitted to at least one blade of a ceiling fan to extract particulates from the air. FIGS. 11*a* and 11*b* illustrate one embodiment of a conventional ceiling fan 105 comprising a plurality of blades 110 attached to central core 115. The fan is connected to a ceiling through hub 120.

Figure 12A:
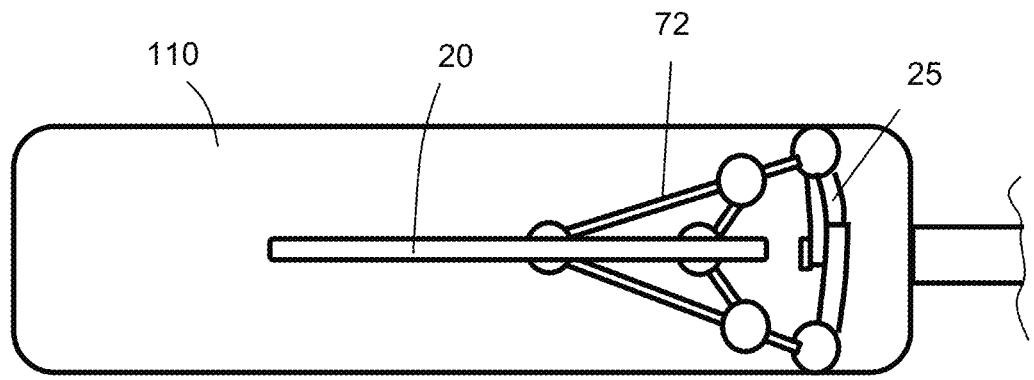
FIG. 12a is a top plan view of a ceiling fan blade configured with a device in accordance with some embodiments of the presently disclosed subject matter.
Figure 12B:
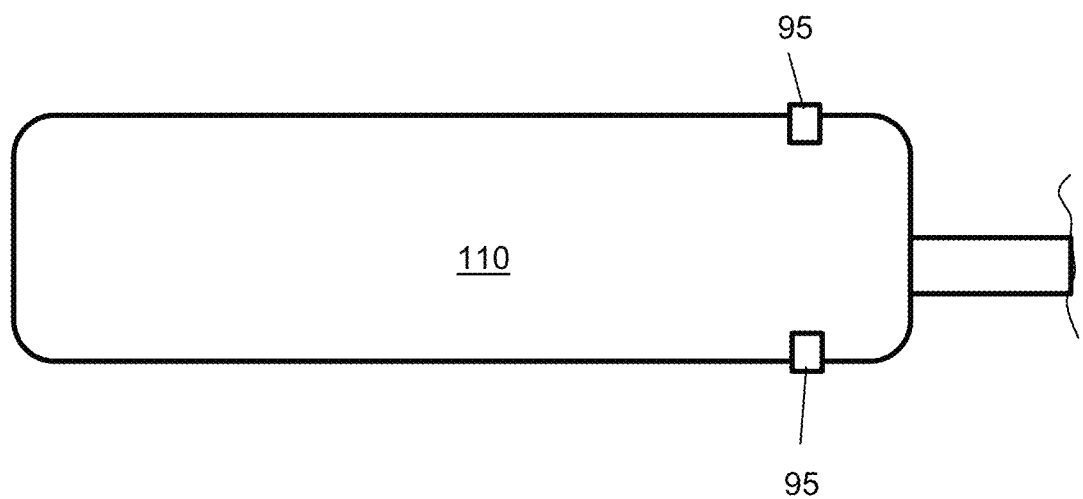
FIG. 12b is a bottom plan view of a ceiling fan blade configured with a device in accordance with some embodiments of the presently disclosed subject matter.

To attach device 5, the user positions the device on the top surface of at least one fan blade 110 (i.e., towards the ceiling). Device support 20 extends down the length of the blade, as shown in FIG. 12*a*. Typically, the device will be positioned on the top surface of the blade, e.g., facing the ceiling. In this way, viewers from above do not see the full device for a more aesthetic appearance. The only portion of the device that is visible from underneath the fan is brace 95, as shown in FIG. 12*b*. However, the presently disclosed subject matter is not limited and the device can be configured on either surface of fan blade 75.

The device can be positioned at a desired location on the fan blade and does not move (e.g., braces 95 maintain the device in proper position). The device can therefore be positioned on at any location on the fan blade, so long as it is properly secured.

Figure 12C:
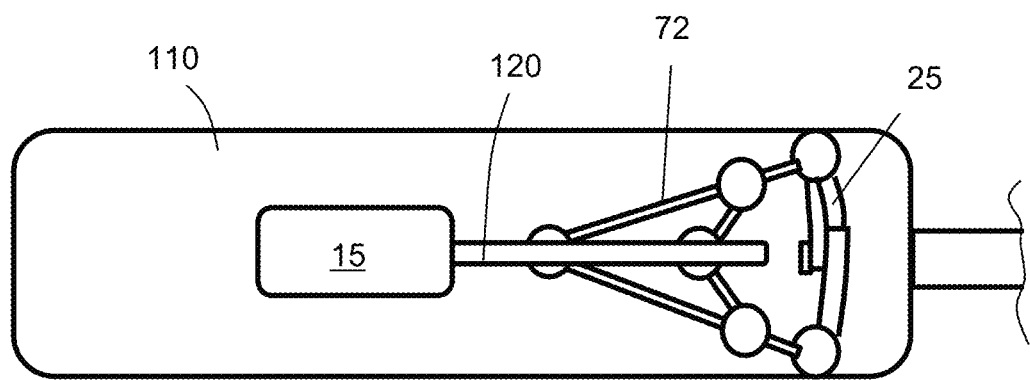
FIG. 12c is a top plan view of the ceiling fan blade of FIG. 12a configured with a filter in accordance with some embodiments of the presently disclosed subject matter.

Either before or after positioning the device on fan blade 110, air filter 15 is releasably attached to support 20 as shown in FIG. 12*c*. Any attachment mechanism can be used, such as a snap-fit closure, magnets, mechanical closures (clips, clasps, screws, bolt, and the like).

It should be appreciated that device 5 can be assembled and mounted on one or a plurality of ceiling fan blades. Thus, in some embodiments, opposing blades can each include a device.

In some embodiments, a fan blade opposing the device can include a weight to keep the ceiling fan blades in balance. Alternatively, an additional device can be assembled on the opposing fan blade as a counterbalance.

After the device has been installed on one or more ceiling fan blades, a user can activate the fan to begin rotation of blades 110. As the fan moves, air is drawn upward to flow through filter 15, trapping particulates therein. Particularly, the fan blades rotate in a plane substantially perpendicular to the airflow caused by the fan. An area of relatively high pressure will be formed on the bottom surface of the fan blades (when the fan is operating in a counter-clockwise direction), and an area of relative low pressure will be formed on the upper surface of the fan blades. As a result, a considerable volume of air will penetrate filter 15, allowing the airborne particulates in the volume of air to be trapped within the filter. In this way, device 5 can remove pollen, allergens, hair, dust mites, pet dander, and/or dead skin cells. The device therefore allows for continuous filtration of the air and accomplishes desirable air circulation. The filter will therefore perform so long as the ceiling fan blades are turning.

It should be appreciated that after a period of use, air filter 15 will accumulate a volume of dust and other particulates such that the filter may need cleaning or replacement. Device 5 is configured to allow the filter to be readily and easily removed upon demand. In some embodiments, the filter can be cleaned without removing it from the device. The disclosed device therefore reduces the amount of dust and particulates in the air.

In some embodiments, device 5 can be provided as a kit that additionally includes one or more air filters 15. For example, the kit can include a plurality of air filters for use in various locations throughout a home or business. Thus, a variety of different air filters can be included, such as the use of an antimicrobial filter for use in a kitchen in addition to standard filters for dust.

Although discussed regarding a ceiling fan, the presently disclosed device can also be used with any of a number of other conventional types of rotating fans, such as box fans or fans that rest on the floor.

The presently disclosed device offers many benefits when compared to conventional air filter units. For example, prior art air filters are often bulky and noisy. In comparison, the disclosed device is essentially soundless and offers a streamlined design.

In addition, the disclosed device can be removably attached to the top or bottom surface of a conventional ceiling fan blade. As a result, the device is portable, and can be moved as desired by the user.

The disclosed device effective reduces or eliminates harmful particulates from a room. Accordingly, the health and safety of people living and working within the space is improved.

Device 5 takes up virtually no living or working space of a home or workplace. Further, when positioned on the top surface of a ceiling fan blade, the device is barely noticeable and is therefore aesthetically pleasing.

The disclosed device enhances the overall atmosphere of a room where it is installed and used by circulating and filtering air, while generating virtually no background noise.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. An air filter attachment device, the device comprising:
    a longitudinally extending support comprising a horizontal top face, an opposed horizontal bottom face, a first end, and an opposed second end;
    a foundation operably connected to the horizontal bottom face only of the support, wherein the foundation is defined by:
        a pair of outer arms, each comprising a first end and a second end and a length therebetween, wherein the first ends of the outer arms are rotatably joined together at a joint that is attached to the horizontal bottom face of the support along the length of the support between the support first and second ends;
        a pair of interior arms, each comprising a first end and a second end, wherein the first ends of the interior arms are rotatably joined together at a joint that is attached to the bottom surface of the support, and wherein the second end of each interior arm is rotatably joined to the length of an outer arm; and
        an adaptor positioned between the second end of each outer arm, wherein the adaptor increases or decreases the distance between the second ends of each outer arm;
    a mount attached to only the horizontal top face of the support, the mount comprising a first face and an opposed second face, wherein the first face of the mount is positioned on the horizontal top face of the support, and wherein the second face of the mount is configured to releasably attach to an air filter;
    wherein the mount is separated from the foundation by the support.

2. The device of claim 1, further comprising an air filter releasably attached to the mount on the top surface of the support.

3. The device of claim 2, wherein the air freshener includes a first end adjacent to a first end of the support and a second end that is adjacent to second end of the support, and wherein a portion of the first end of the support extends beyond the first end of the air freshener, and a portion of the second end of the support extends beyond the second end of the air filter.

4. The device of claim 1, wherein the adaptor includes a first segment and a second segment that cooperate via a telescoping arrangement.

5. The device of claim 4, further comprising a gripping segment that facilitates movement of the first and second segments.

6. The device of claim 4, wherein the first segment comprises a series of teeth that releasably fit into grooves positioned on the second segment.

7. The device of claim 1, wherein the first ends of the outer arms are rotatably joined at an acute angle.

8. The device of claim 1, further comprising a plurality of L-shaped braces.

9. A kit comprising:
    at least one air filter; and
    one or more of the air filter attachment devices of claim 1.

10. The kit of claim 9, wherein the air filter comprises fiberglass, paper, fiberglass, paper, foam, woven fabric, activated charcoal, carbon, zeolite, or combinations thereof.

11. The kit of claim 9, wherein the air filter is electrostatic.

12. The kit of claim 9, wherein the air filter comprises one or more antimicrobial materials.

13. The kit of claim 9, wherein the adaptor includes a first segment and a second segment that cooperate via a telescoping arrangement.

14. The kit of claim 13, wherein the first segment comprises a series of teeth that releasably fit into grooves positioned on the second segment.

15. The kit of claim 9, wherein the first ends of the outer arms are rotatably joined at an acute angle.

16. A method of reducing the number of particulates in the air, the method comprising:
    Attaching the air filter attachment device of claim 1 to at least one blade of a ceiling fan;
    releasably attaching an air filter to the support of the device;
    initiating movement of the ceiling fan blades such that air passes through the air filter;
    whereby the number of particulates in the air is reduced.

17. The method of claim 16, wherein the device is positioned on a top surface of a ceiling fan blade.

18. The method of claim 16, wherein the air filter comprises fiberglass, paper, fiberglass, paper, foam, woven fabric, activated charcoal, carbon, zeolite, or combinations thereof.

19. The method of claim 16, wherein the air filter is electrostatic.

20. The method of claim 16, wherein at least one surface of the outer arms, inner arms, or adaptors comprises a gripping material.

\* \* \* \* \*